(12) United States Patent
Sanders

(10) Patent No.: US 6,289,749 B1
(45) Date of Patent: Sep. 18, 2001

(54) THRUST SENSOR ASSEMBLY

(75) Inventor: Peter George Sanders, Frome (GB)

(73) Assignee: Rotork Controls Limited, England (GB)

( * ) Notice: Subject to any disclaimer, the term of this patent is extended or adjusted under 35 U.S.C. 154(b) by 0 days.

(21) Appl. No.: 09/485,009

(22) PCT Filed: Jul. 29, 1998

(86) PCT No.: PCT/GB98/02270

§ 371 Date: Jan. 28, 2000

§ 102(e) Date: Jan. 28, 2000

(87) PCT Pub. No.: WO99/06808

PCT Pub. Date: Feb. 11, 1999

(30) Foreign Application Priority Data

Aug. 1, 1997 (GB) .................................................. 9716158
Apr. 20, 1998 (GB) .................................................. 9808336

(51) Int. Cl.[7] ...................................................... G01L 5/12
(52) U.S. Cl. ........................................................ 73/862.49
(58) Field of Search ........................ 73/862.49, 862.381, 73/818, 824, 862.451

(56) References Cited

U.S. PATENT DOCUMENTS

| 4,182,168 | * | 1/1980 | Desch | ................. | 73/862.49 |
| 4,856,327 | * | 8/1989 | Branam et al. | ................. | 73/862.49 |
| 4,898,362 | * | 2/1990 | Loan | ................. | 251/192.12 |
| 5,036,714 | * | 8/1991 | Christoffers et al. | ............. | 73/862.57 |
| 5,527,194 | * | 6/1996 | Strong et al. | ....................... | 73/862.49 |
| 6,105,439 | * | 8/2000 | Roger | ................. | 74/862.49 |

FOREIGN PATENT DOCUMENTS

| 4239947 C1 | 11/1992 | (DE) . |
| 0363785 | 10/1989 | (EP) . |
| 0668491 A2 | 2/1995 | (EP) . |
| 0730114 A1 | 9/1996 | (EP) . |

* cited by examiner

*Primary Examiner*—Max Noori
(74) *Attorney, Agent, or Firm*—Galgano & Burke

(57) ABSTRACT

A thrust sensor assembly suitable for use with an actuator of the type wherein motive power is applied to an actuator shaft and wherein the thrust sensor assembly comprises a first compression plate means and a second compression plate means, at least one of said compression plate means being on or adapted to engage directly or indirectly with a said shaft to move axially with the shaft and the second compression plate means being arranged to oppose the first compression plate means with resiliently compressible pad(s) sandwiched there between, a pressure transducer being mounted on one of the first or second compression plate means, whereby movement of the first compression plate means toward the second compression plate mans compresses the compressible pad(s) between the two compression plate means and against the pressure transducer and thereby inducing a signal from the pressure transducer that corresponds to the thrust of the actuator shaft.

23 Claims, 8 Drawing Sheets

THRUST SENSOR ASSEMBLY

FIELD OF THE INVENTION

The present invention relates to thrust sensors. It is particuliarly applicable but in no way limited to the continuous measurement of the thrust generated in the shaft of a mechanically operated actuator. Where the rotary motion of the shaft is converted to a linear motion by the use of a helical screw thread and nut or other rotary to linear motion converters, the invention relates to the continuous direct measurement of the axial force sustained by the shaft's thrust bearings.

The invention also applies to actuators operated by fluid pressure in which the shaft is connected directly or indirectly to a fluid operated piston or is driven via electro-hydraulic or electro-fluid means.

The invention is particularly applicable to actuator gear boxes used to operate valves and penstocks in fluid transfer systems.

In the context of the foregoing statements it is understood that the term "fluid" covers liquids, gases and vapours.

BACKGROUND TO THE INVENTION

In actuators it is generally desirable to be able to continually monitor and control accurately the forces, or the torque, being generated at the valve spindle. When the valve is closed these forces or torques produce the "seating" or "sealing" force between the valve seat and the moving element. It is also necessary to be able to monitor the force or torque required to open a seated valve which can be considerably higher than the seating force or torque due to friction and to the build up of hydrostatic pressure difference across a closed valve seat.

In some valves a "back-seat" is provided when the valve is fully open, this requires an additional need for monitoring and control facilities when the actuator is operating in a direction to open the valve.

Although the main concern in valve actuators is to be able to monitor and control the seating forces on the valve moving element, there is also a need to monitor the forces set up when the valve is being moved through it's travel. An example of this requirement is when high, unbalanced forces due to hydrostatic and hydrodynamic pressure gradients are present across the valve seat and when it is necessary, in certain critical installations, to continually monitor the actuator gear box efficiency.

In mechanically operated valve actuators the final drive to the output shaft is usually a worm and worm wheel. In this type of gear drive the torque generated at the output shaft on which the worm wheel is mounted can be determined by measuring the axial force on the worm shaft and multiplying this quantity by the pitch circle radius of the worm wheel. Thus it can be seen that a force measuring element designed to monitor the axial force being generated in the worm shaft can be used to determine the torque being generated in the worm wheel shaft of the gear box.

Actuator force and torque measuring systems are known, for example in Patent No. GB 2 196 494 B (Rotork Controls Ltd.) where the deflection of a spring centred worm shaft is measured by the use of a potentiometer and in Patent No. DE 4239947 Cl (Werner Riester) and Patent Application No. EP 0730114 Al (Nippon Gear Co.) where the axial force is allowed to react on a diaphragm member provided with strain gauge(s) and interposed between the shaft bearing and the actuator housing. U.S. Pat. No. 4,898,362 (Liberty Technoiogy Center Inc) describes an actuator incorporating a thrust sensor positioned between a stem nut and a stem nut lock. Whilst this sensor enables the motor to be switched off once a predetermined thrust is reached it does not permit continuous thrust measurements to be made.

Compressive force sensors are known from other spheres of engineering. For example, EP 0668491 (The Timken Co.) describes a hub arrangement which rotates around a spindle on bearings. In order to optimize the pre-load on the bearings the force which represents the preload in the bearings is transmitted through a force sensor which produces a signal that reflects the magnitude of the force. By monitoring the force sensor one can adjust the bearings to a desired preload.

U.S. Pat. No. 5,036,714 (WABCO Fahrzeughremsen GmbH) describes an apparatus for measuring the axial force transmitted by a coupling device which can generate signals which are indicative of the magnitude of such axial force. In this case relatively large elastomeric elements are mounted between opposing transfer shoulders. A pressure sensor is in indirect contact with an elastomeric element with a small, soft elastomeric pad being interposed between the two.

EP 0363785 (Polysens SpA) describes the use of a piezo-electric gasket as a transducer for detecting dynamic forces between two opposing surfaces.

In such prior art the measurement of the axial force depends on accurate calibration of the force measuring elements which may affect the integrity and accuracy of the signal. Potentiometers and spring packs are subject to wear and fatigue and strain gauges, mounted on metal diaphragms are expensive to assemble and to calibrate.

A further fundamental problem with such existing technology is that the wide output force range covered in a typical range of valve actuators requires that several sizes of force measuring elements have to be provided and kept in stock. This involves for example holding stocks of spring packs or diaphragms of varying sizes and stiffness. This requirement is needed to cover a typical output torque or force range ratio of 30/1 spread over several actuator frame sizes. These multiple components are required both for manufacture and servicing out in the field and represent a major expense.

The improvement to actuator technology, the subject of this invention, is to arrange for the force generated in a shaft to react against a rigid backing plate to which is attached a resilient polymer member. The polymer member is in contact with a mounting plate, the arrangement being such that the axial force generates a compressive stress or pressure in the polymer member which is substantially equal to the force divided by the contact surface area.

An electronic pressure transducer is inserted into the mounting plate with its sensitive face flush with the plate surface and in contact with the resilient polymer member. The arrangement is such that the pressure transducer will now register a pressure which is substantially equal to the uniform pressure existing in the polymer member. Thus, by altering the contact area of the polymer member any desired substantially linear relationship can be achieved between the force being sustained by the shaft and the transducer output.

In particular, it is one of the objects of this invention to be able to use a single size of pre-calibrated pressure transducer to be inserted in any build of actuator in the range and so design the resilient pad area in each actuator frame size that the range of forces generated in each actuator falls within the operating range of the single size pressure transducer.

A further problem which is not addressed or even anticipated by the prior art above is the non-linearity of response of a pressure transducer mounted on an elastomeric pad whose edge(s) are unconstrained. Compression of an unconstrained pad results in a bulging out of the perimeter side(s). That is to say, whilst the initial cross-section of the elastomeric pad is substantially rectangular under zero torque conditions, application of torque distorts the pad such that the cross-section tends to resemble that of a doughnut. This causes calibration and non-linearity difficulties and tends to defeat the objection of covering a range of valve actuator sizes by simply altering the contact area of the elastomeric pad or pads to suit.

It will be appreciated that, whilst only a single transducer is needed, there may be valves installed in critical areas where more than one pressure transducer is used in order to provide a safety back up.

SUMMARY OF THE INVENTION

A thrust sensor assembly suitable for use with an actuator of the type wherein motive power is applied to an actuator shaft and wherein the thrust sensor assembly comprises a first compression plate means and a second compression plate means, at least one means being on or adapted to engage directly or indirectly with a said shaft to move axially with the shaft and the second compression plate means being arranged to oppose the first compression plate means with at least one resiliently compressible substantially elastomeric pad sandwiched there between, a pressure transducer being mounted on one of the compression plate means, whereby movement of the first compression plate means towards the second compression plate means compresses the elastomeric pad(s) between the two compression plate means with not all of the pad or pads pressing against the pressure transducer and inducing a signal from the pressure transducer that corresponds to the thrust of the actuator shaft, the thrust sensor assembly being adapted such that the total contact area of the surface of the compressible pad or pads facing the one of the compression plate means bearing the pressure transducer is selectively variable to alter the proportion of thrust transmitted to the transducer by replacing the pad or pads with one or more larger or smaller pads or using a greater or lesser number of substantially identical pads, whereby a wide range of actuator thrusts may be accommodated whilst maintaining the pressure applied to the pressure transducer within the operating range of said pressure transducer.

This arrangement provides a compact, space-efficient sensor which does not require springs. This arrangement also allows the pressure transducer to operate to sense the thrust when the thrust is well beyond the normal operating range of the transducer by allowing the high thrusts to act over an area which is greater than the sensitive area of the transducer. This avoids the need to replace the transducer itself.

In the preferred embodiment the thrust is derived by multiplying the signal from the pressure transducer by a transducer constant (see page 15) and again by the total area of the pad(s)

For the avoidance of doubt, the first compression plate means may, for example, be an independent plate or ring around the shaft or may be a flange or shoulder on the shaft and the second compression plate means may, for example, comprise an independent plate or ring or an end wall or shoulder of the thrust sensor assembly housing. These variants are detailed in the description of the preferred embodiments herein below and in the case of the first preferred embodiment described herein below, the term "backing plate" is used to describe the first compression plate means and the term "mounting plate" is used to describe the second compression plate means.

The total combined contact area of the surface of the compressible pad or pads facing the one of the compression plate means bearing the pressure transducer is in most cases greater than the pressure sensitive surface area of the pressure transducer alone such that the pressure of the pad or pads under compression, in use, is distributed over a known contact area that comprises both the pressure transducer sensitive surface and a known size of surface area of the pressure transducer-bearing compression plate means.

In this first aspect of the invention the total contact area of the compressible pad or pads is selectively variable by replacing the pad or pads with one or more larger or smaller pads or using a greater or lesser number of substantially identical pads, whereby a wide range of actuator thrusts may be accommodated for by adjusting the pressure applied to the pressure transducer to be within the operating range of the pressure transducer.

Preferably the or each pad is fixedly mounted on the first or second compression plate means. This avoids inadvertent movement of the pad during operation.

Advantageously, the or each pad is mounted on rigid intermediate member, thrust being transmitted from the first compression plate means to the pad(s) via the intermediate member. This arrangement enables the pads to be changed readily and also the number, size and configuration of the pads to be changed at will.

Preferably one or more recesses are provided in one of the compression plate means or, where a rigid intermediate member is provided between the compression plate means, optionally in the intermediate member the or each recess to accommodate a respective said elastomeric pad and fully constrain the periphery of the pad whereby ail of the pad or pads are fully periphery constrained in use. The constrained pad periphery arrangement mitigates or overcomes the very substantial problem of errors arising from bulging and creep of the pad(s).

Preferably the compression plate means or intermediate member opposing and pressing towards the one of the compression plate means or intermediate member having the recess(es) is configured to project into said recess(es) to press against the pad(s).

Alternatively an incompressible insert may be provided in the or each recess to lie over the pad(s) and evenly transmit the compressive force to the pad(s) in use. The insert is shaped to fit into the recess and may, for example, be a metal disc or annulus. By either of these arrangements it is ensured that the thrust is transmitted fully to the pad(s) without requiring the pad(s) to project out of the recess(es) to make contact with the opposing compression plate means or intermediate member. This is important to maintain substantially full constraint throughout the plate movement being sensed.

Advantageously, especially in installations where the periphery of each compressible pad is unconstrained, the pad or pads are of laminated construction, comprising a pair of resiliently compressible layers, one on each side of a layer of material of higher modulus of elasticity. The pair suitably comprise rubber or another elastomeric material and the intervening layer is suitably nylon or a similar high modulus of elasticity material. This arrangement helps to minimise or even eliminate any spreading of the pads against the compressing surfaces when the thrust is applied, thereby ensuring maintenance of a substantially simple relationship between the thrust applied and the signal from the pressure transducer. In installations where the periphery of the resilient pad or pads is constrained by being inserted, for example, in a recess in the backing plate, a homogeneous resilient material may be used such as silicone rubber.

In one preferred embodiment, the assembly is adapted for end-mounting on a said shaft. By using a single pad and transducer mounted end-onto the shaft and aligned with the shaft axis then thrust in one direction can be measured simply and efficiently.

Preferably the second compression plate means is engageable with the shaft to move with the shaft when the shaft moves in the reverse direction and the first compression plate means is disengageable from movement with the shaft when the shaft moves in the reverse direction, whereby the thrust in the reverse direction may be sensed.

Suitably, the pressure transducer is incorporated into one of said compression plate means with the pressure-sensitive face of the transducer flush with the face of the compression plate means in which it is mounted Suitably, the or each compression plate means is circular and/or annular.

Preferably the or each resilient pad is circular and/or annular.

Suitably two resilient pads are provided, said pads being positioned diametrically opposed to each other.

The invention further extends to a valve actuator incorporating a thrust sensor assembly as described herein.

BRIEF DESCRIPTION OF THE DRAWINGS

Preferred embodiments of the invention will now be described, by way of example only, with reference to the accompanying drawings in which.

DESCRIPTION OF THE PREFERRED EMBODIMENTS

Embodiments of the present invention will now be described by way of example only. They are not the only ways that the invention may be put into practice but represent the best ways currently known to the Applicant.

A first embodiment will now be described with reference to an actuator in which it is required to measure thrust in two directions at 180° to each other i.e. both directions along a shaft.

Simplified embodiments and embodiments adapted to measure thrust in only one direction will be described later.

Figure 1:
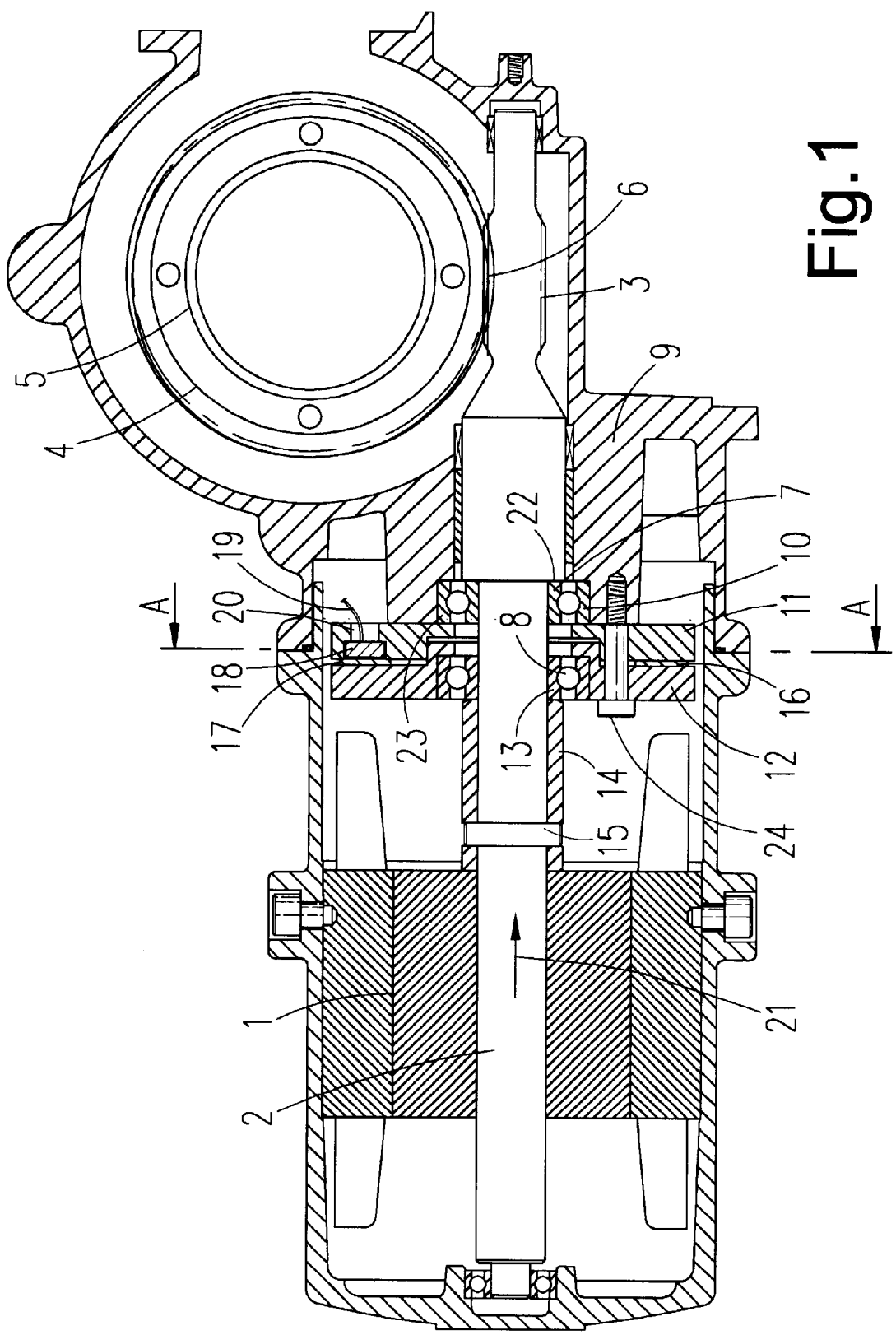
FIG. 1 shows a part of an electric actuator sectioned on a plane coincident with the electric motor shaft centre-line to reveal the worm shaft which is integral with the motor shaft and the worm wheel which surrounds the output shaft of the actuator.
Figure 2:
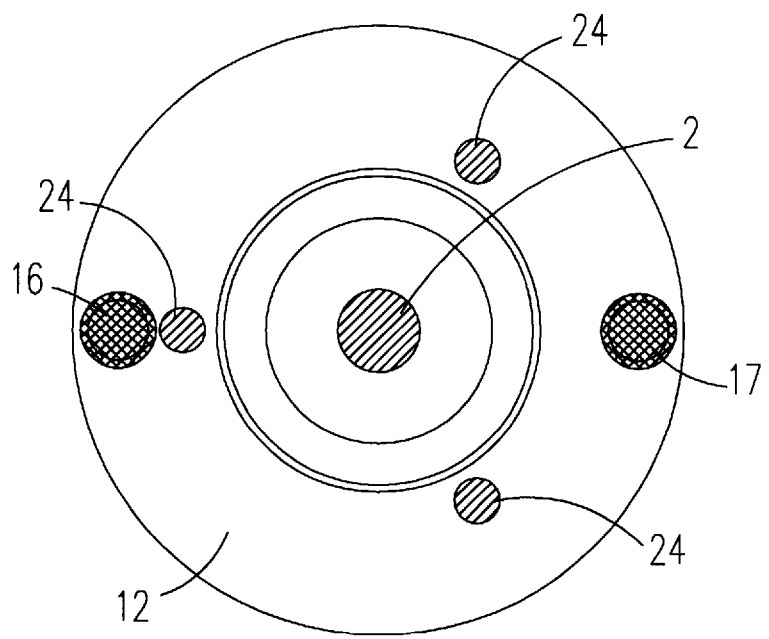
FIG. 2 is a local section taken through the worm shaft thrust bearing assembly and designated by plane AA in FIG. 1.

Referring to FIG. 1 and FIG. 2, the electric motor 1 rotates a worm shaft 2 on which is machined a worm 3 meshing with the a wheel 4 which surrounds the output shaft 5 of the actuator. The worm wheel 4 can be clutched to the output shaft 5 by means of a sliding dog clutch which is not illustrated in FIG. 1.

When the actuator is operated the external load generates a reacting torque on the worm wheel 4 which, in turn, becomes an axial force on the worm shaft 2, the force being transmitted via the worm/worm wheel meshing teeth 6. The worm shaft axial force vector may be present in either direction, depending upon the direction of rotation of the worm wheel 4. A pair of deep groove ball bearings 7 and 8 are provided on the worm shaft 2; these act as combined journal and thrust bearings.

Bearing 7 is mounted in a recess in the actuator housing 9 the outer track ring 10 being a free fit in the recess. The bearing is located axially in the recess by an abutment between the outer track ring 10 and the mounting plate 11.

Bearing 8 is contained within a recess in the backing plate 12. The inner track ring 13 of bearing 8 forms an abutment with the sleeve 14 which is fixed to the worm shaft by the pin 15.

Sandwiched between the mounting plate 11 and the backing plate 12 are two resilient polymer discs 16 and 17. These are on the same pitch circle diameter and mounted 180 degrees apart. The discs are attached to the backing plate 12 and one disc 17 is arranged to be placed over the sensitive face of an electronic pressure transducer 18 positioned in a recess in the mounting plate 11. The flying leads are arranged to pass out from the rear of the mounting plate via the hole 20. The transducer will preferably be of the type employing a strain gauge or a piezoresistive sensing element arranged in a normal Whetstone Bridge network with a compensating thermo-resistor, the associated circuit being arranged so that the voltage output from the transducer will have a linear, or near linear relationship with the pressure applied to the transducer sensitive face. However, any suitable pressure sensing device capable of detecting pressure changes at its face can be employed.

If the shaft 2 is provided with a right handed helical worm 3 and the worm wheel is being rotated in a clockwise direction as viewed in FIG. 1 the direction of the axial force will be as indicated by the arrow 21. The axial force will be transmitted by the bearing 8 to the backing plate 12 and hence to the resilient polymer members 16 and 17. The pressure generated in these disc shaped members will be the axial force divided by the combined area of the two discs in contact with the backing plate. In this arrangement, the disc 17 will transmit this pressure to the sensitive face of the transducer 18 so providing a signal which is substantially proportional to the axial force in the shaft 2.

If the direction of the motor is now reversed causing the worm wheel to rotate in an anti-clockwise direction as viewed in FIG. 1 the bearing 7 will now be transmitting the axial force in the shaft 2 via the abutment 22. The static outer track ring of the bearing 7 transmits the force via the abutment 23 to the mounting plate 11. The force is now transmitted to the backing plate 12 via the resilient polymer members 16 and 17. In this mode the backing plate is restrained from axial and rotational movement by three tension shoulder bolts 24 only one of which is shown. Thus it can be seen that the thrust bearing assembly is so designed that axial thrust in either direction on the shaft 2 will cause a compressive pressure to be generated in the resilient polymer members 16 and 17, so providing a force-related signal to be produced from the single transducer 18.

The linear relationship numerical factor by which the value of the electrical signal, for example a voltage signal, is multiplied to obtain the pressure reading is termed the transducer constant. It is possible to use this simplified relationship because the transducer characteristic curve between the applied pressure and the voltage reading is, substantially, a straight line passing through, or close to the origin. However, it is within the scope of this invention to encompass other non-linear relationships in which cases a table or chart may be provided in order to derive the applied pressure value from the voltage reading, or, alternatively, the said table or chart may be incorporated into a computer programme.

Figure 3:
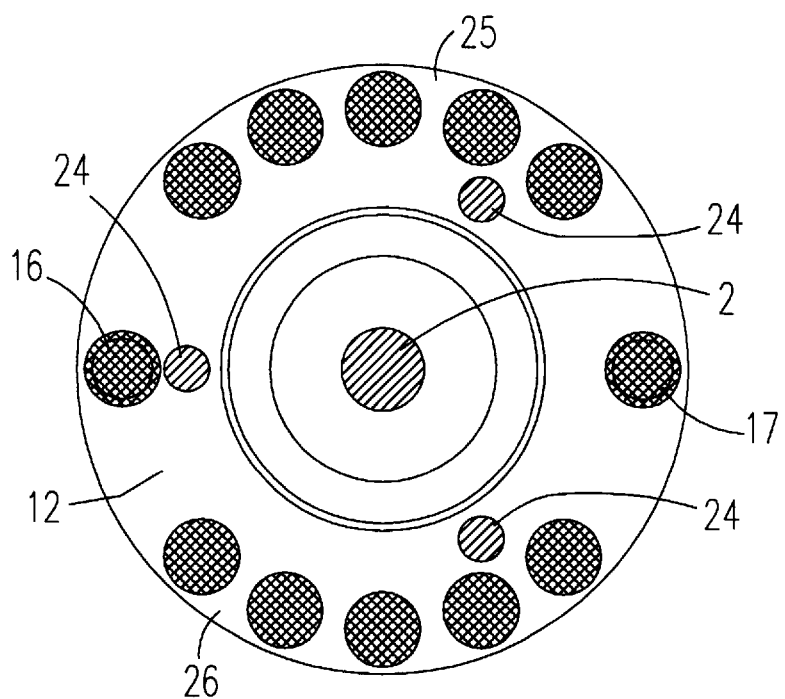
FIG. 3 is a view on the same plane AA as FIG. 2 but showing an alternative arrangement of the resilient polymer members.

Referring to FIG. 3, the resilient polymer members 16 and 17 have been augmented by two additional groups of resilient polymer discs 25 and 26 in order to increase the area acted upon by the axial forces in the shaft 2. The assembly is still provided with a single pressure transducer in contact with the resilient polymer member 17.

Considering some typical dimensions and values, if the mid-range signal pressure indicated by the transducer is 10 bar (=1 N/mm$^2$) and the two resilient polymer member members 16 and 17 are each 12 mm in diameter, then a 10 bar pressure reading would indicate an axial force of:

$$\pi/4 \times 12^2 \times 2 \times 1 = 226N.$$

In the case of FIG. 3, the total contact area has been increased by the addition of ten resilient polymer discs in two groups 25 and 26. These discs are made to the same dimensions as discs 16 and 17 so that the 10 bar (1 N/mm$^2$ transducer pressure reading now indicates an axial force of:

$$\pi/4 \times 12^2 \times 12 \times 1 = 1357N$$

Figure 4:
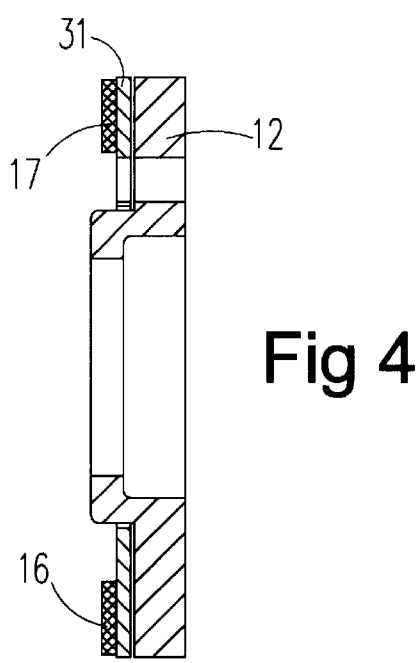
FIG. 4 shows an alternative section through a part of a thrust bearing assembly in which the resilient polymer members are attached to a separate thin plate.

Referring to FIG. 4, in order to enable a quick and simple change to the area of the resilient polymer members to be made, it may be more convenient to have the resilient polymer members attached to a separate thin plate 31, the plate being inserted between the backing plate 12 and the mounting plate 11. The actuator may then be supplied with a set of alternative resilient polymer members already attached to plates 31 so that a rapid field change can be made.

The ability to measure the thrust produced by actuators of different sizes and power inputs using the same pressure transducer is an important feature of this invention. By spreading the transmitted force through a larger area of resiliently compressible material then a range of actuators can be accommodated with a single pressure transducer/thrust sensor assembly set up.

Advantageously, if circular pads of resilient material are used having the same surface area then increasing the number of pads gives an incremental increase in the force that can be measured. It will be appreciated that for this invention to work successfully there should be no significant air gap between the pad 17 and the transducer 18. Also, the invention does not rely fundamentally on the flexing of any diaphragm or equivalent component which is part of the actuator structure as with the prior art, but relies instead on compression of a solid between two flat surfaces.

The alternative embodiment in which the pad or pads are mounted on an intermediate plate simplifies the positioning and exchange of pads considerably.

The pads can be made from any suitable material as selected by the materials specialist such as, for example, silicone rubber having hardness on the IRHD scale between 25 and 60. The pads can, of course, be made of any natural or synthetic resilient polymer material provided that the compressive stress range used does not induce creep in the pads and that the physical properties remain substantially constant over the environmental temperature range. As mentioned earlier in cases where the periphery is unconstrained the pad is most preferably a laminated resilient polymer pad formed with a pair of outer resilient polymer layers that are suitably rubber or another elastomeric material sandwiching between them an intervening layer of a plastics sheet which may be nylon, for example, which has higher modulus of elasticity properties than the resilient material. The pad may, for example, comprise resilient layers that are cut out from 0.75 mm thick silicone rubber sheet and the intervening sheet may be 0.25 mm thick nylon. This laminated construction reduces the spread of the pads against the compressing surfaces in use.

Figure 11:
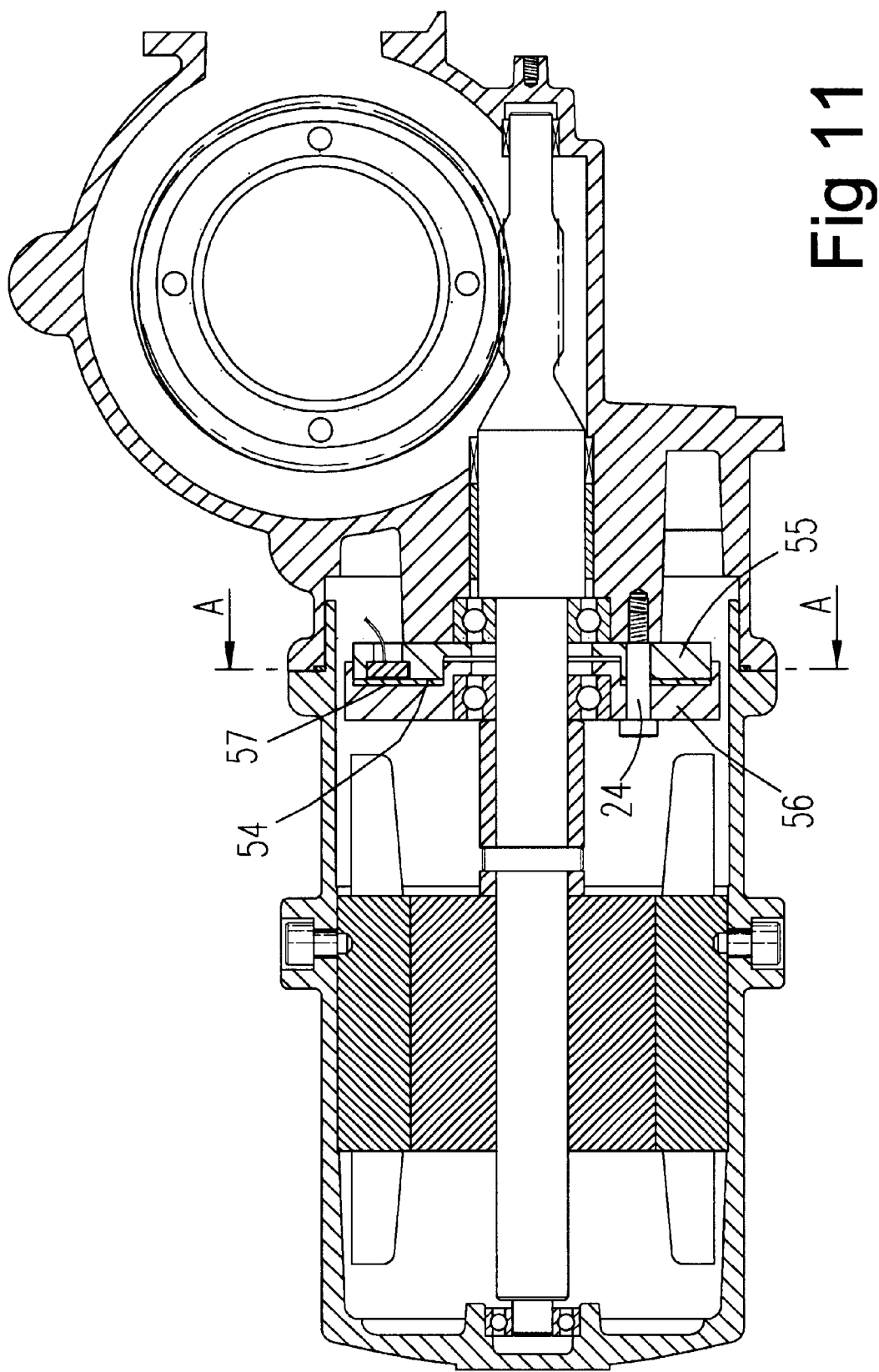
FIG. 11 illustrates a further embodiment and modification to the actuator as shown in FIG. 1 and in which an annular resilient pad is mounted in such a manner that all the peripheral edges are constrained.

In cases where the periphery of the resilient pad is constrained, as illustrated in FIG. 11, the pad may be made of a homogeneous polymer material.

Figure 5:
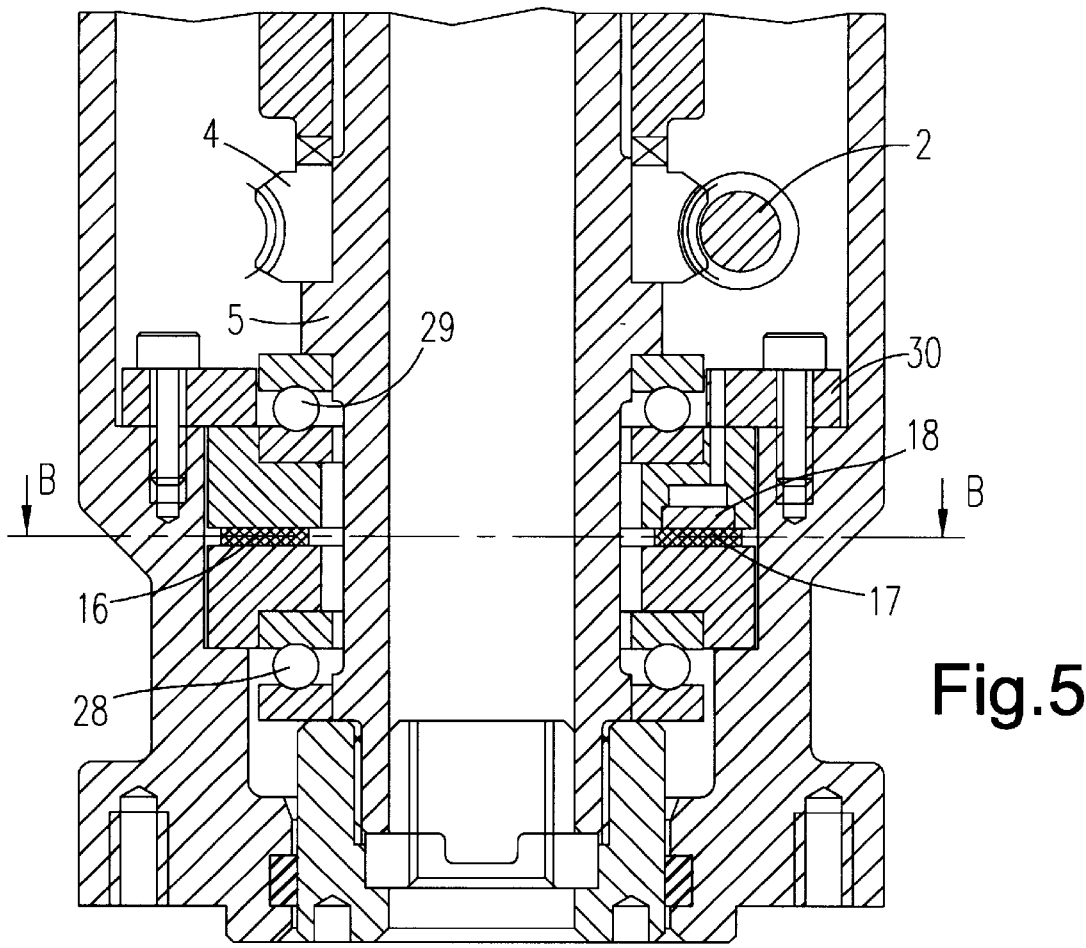
FIG. 5 shows a section taken through the output shaft of the actuator to reveal the alternative embodiment of the invention being the measurement of the axial force generated by the output shaft.

FIG. 5 shows the pressure transducer 18 inserted into the thrust bearing assembly surrounding the actuator output shaft 5 and designed to measure the axial force existing in either direction in the output shaft. In this embodiment the heavier forces sustained by the output shaft require that the ball thrust bearings 28 and 29 are used in place of the combined journal and thrust bearings 7 and 8 shown in FIG. 1.

The principle of operation is the same as for the assembly illustrated in FIG. 1. In this embodiment the upward, as illustrated, axial force on the output shaft is contained by the retaining ring 30.

Figure 6:
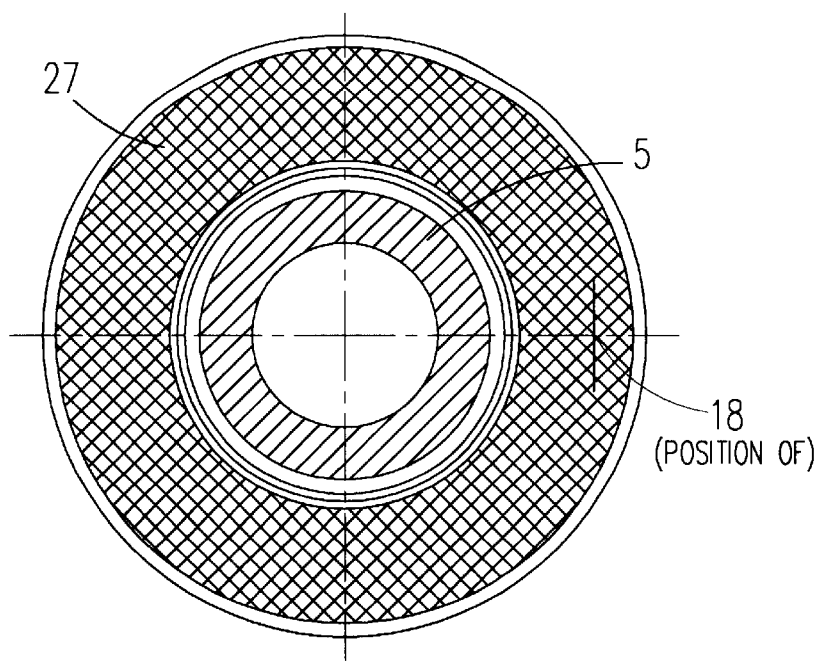
FIG. 6 shows an alternative Section BB in FIG. 5 in which the individual resilient polymer members are replaced by a single annular resilient polymer member.

FIG. 6 shows a single annular shaped resilient polymer member 27 fitted in place of the individual disc shaped members 16, 17, 25 and 26 illustrated in FIGS. 1, 2 and 3. This is in order to obtain the maximum possible resilient surface area and may be needed, typically, on an actuator output shaft where the axial forces are considerably higher than those existing on the worm shaft. Assuming that the maximum size of the annular shaped polymer member is 80 mm outside diameter and 45 mm inside diameter, this will provide an area of 3436 mm$^2$. At 10 bar transducer reading this will indicate an axial force of 3436N.

Thus it can be seen that, with the particular example chosen for illustration. the mid-range signal of the transducer can be extended to indicate a force range from 226N to 3436N, a ratio of approximately 15:1.

In the specific example described and illustrated it will be noted that the resilient polymer discs, when used in numbers greater than two have been kept to the same diameter and thickness as the disc 17 placed over the transducer 18. This is to ensure that the discs are all subjected to the same pressure so that the single transducer pressure reading multiplied by the total sum of the disc areas represents the axial force on the shaft. It is possible, however, to use individual resilient polymer members of different shapes with peripheries unconstrained in an assembly provided that certain constraints are used which take account of the fact that, in polymer technology, the compressive modulus is a function of both the nature of the material and the relationship of the areas of the free surfaces and the constrained or contact surfaces of the polymer block being stressed. This relationship is described, for example, in the text book "Engineering with Polymers" by Peter C. Powell and published by Chapman and Hall.

For a group of resilient pads to sustain the same internal stress or pressure under a single force it is necessary to ensure that the apparent compressive modulus "E" is the same for all the pads. This is because of the relationship:

E=Stress or Pressure÷Strain.

Figure 7:
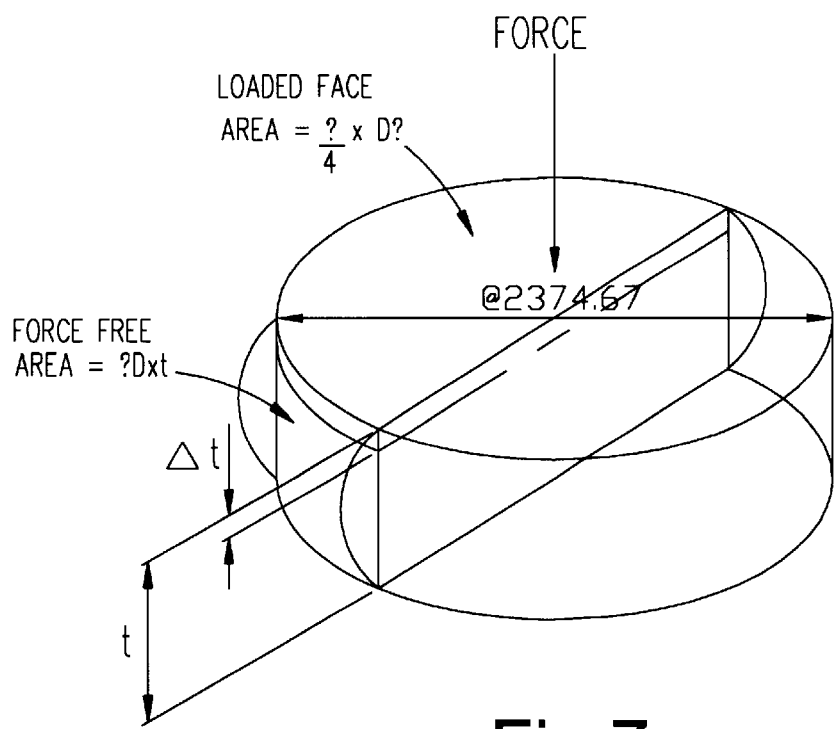
FIG. 7 illustrates the manner in which a polymer block distorts under the action of a force. This figure is needed to assist in the description of the special formula needed to determine the compressive modulus of a polymer block.

In this relationship, Strain is defined as the ratio of the deflection of each pad divided by the unstressed thickness i.e. the ratio $\Delta t/t$ as illustrated in FIG. 7.

For a constant thickness, "t" for the group of pads a deflection $\Delta t$ therefore produces the same strain in each pad and, thus, the same pressure provided the apparent compressive modulus, "E" remains constant.

For any specific resilient polymer material, the absolute modulus in tension or compression is a function of the hardness and is usually denoted by "$E_0$". For simple circular and rectangular blocks under compression, the relationship between the apparent modulus "E" and "$E_0$" can be determined by the equation:

$$E=E_0(1+2kS^2)$$

In the above equation, "k" is an empirical constant having a value between 0.5 and 1.0 and related to the material hardness.

The term "S" is called the Shape Factor and is a dimensionless quantity defined as the ratio of the area of one loaded face of the block divided by the total of the force free areas of the block i.e. those faces which are free to bulge out under load. The term "S" is squared in the foregoing equation so it is important to ensure that this ratio remains constant for all the individual blocks in one assembly in order that the apparent modulus term "E" remains constant.

For the particular example, using 12 mm diameter discs which are 2 mm thick the value of the Shape Factor will be:

$$S=(\pi/4\times12^2)\div(\pi\times12\times2)=1.5$$

In this example it would have been possible to add alternative shape pads in place of the discs 25,26 in FIG. 3 provided that the Shape Factor remains at a value equal to 1.5. For additional straight sided rectangular blocks, two shapes which will satisfy this requirement are:

Square 12×12×2 mm thick–$S=12^2\div(12\times4\times2)=1.5$

Rectangle 18×9×2 mm thick $S=(18\times9)\div(18+9)\times2\times2=1.5$

It will be appreciated that an actuator, of the type in question, will normally be supplied with a force measuring transducer fitted to the worm shaft, as in FIG. 1 for measuring torque on the output shaft, or fitted to the output shaft to measure output shaft axial force as in FIG. 5. In certain critical areas, however, it may be necessary to provide both the torque and the output force transducer assemblies in order that a continuous measurement of gear box efficiency can be recorded so that early remedial action can be taken if the efficiency starts to fall indicating an impending gear or bearing failure.

In a similar situation, it may be desirable to provide two or more pressure transducers with independent associated electronic circuits so that any deviation developing between the transducer signals can be monitored—such a deviation giving an early warning that a pressure transducer, or its associated circuit is failing.

Although the foregoing description covers the use of electronic pressure transducers, it will be appreciated that other forms of pressure transducers may equally well be employed such as small deflecting diaphragms associated with fibre optic signals.

The foregoing description relates to a thrust sensor assembly as might be found in a valve actuator where it is required to measure the thrust in both axial directions of the shaft. Where thrust measurements are required in only one direction the assembly can be simplified considerably. It is also possible to locate the thrust sensor assembly at the end of the shaft rather than at some other convenient point along its length. Two such arrangements are shown in FIGS. 8 and 9.

Figure 8:
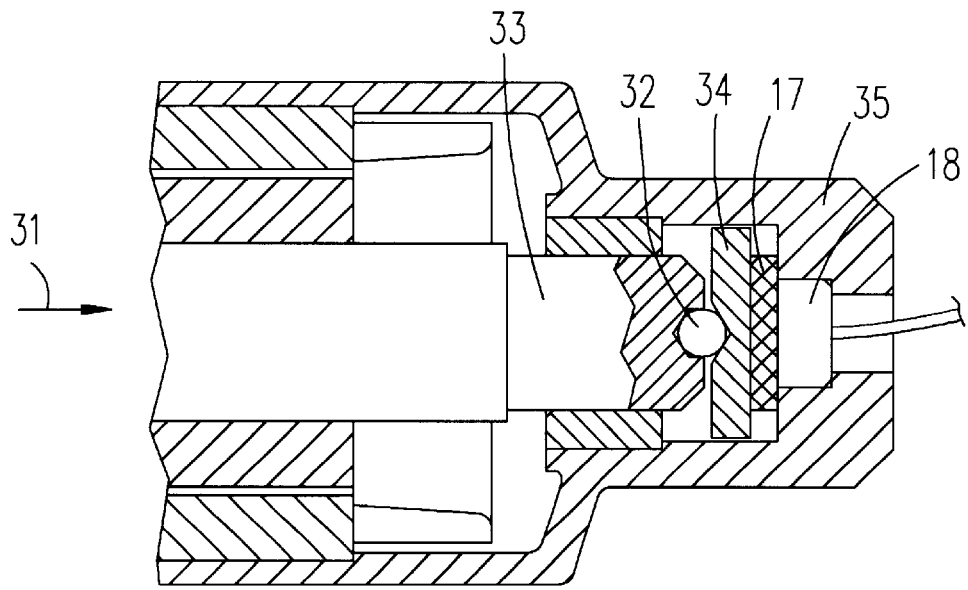
FIGS. 8 and 9 show sensor arrangements where the thrust sensor is positioned on the end of a shaft for measuring thrust in a single direction only.

Referring to FIG. 8, which shows the end of a typical actuator motor shaft, this illustrates a single resilient polymer disc incorporated between a mounting plate 34 and the housing 35. For small actuator motors where the thrust bearing consists of a single ball 32 sandwiched between the motor shaft 33 and the plate 34, the resilient polymer disc 17 can be bonded to the plate 34 and the pressure transducer 18 is then mounted into a recess at the end of the motor housing 35.

Figure 9:
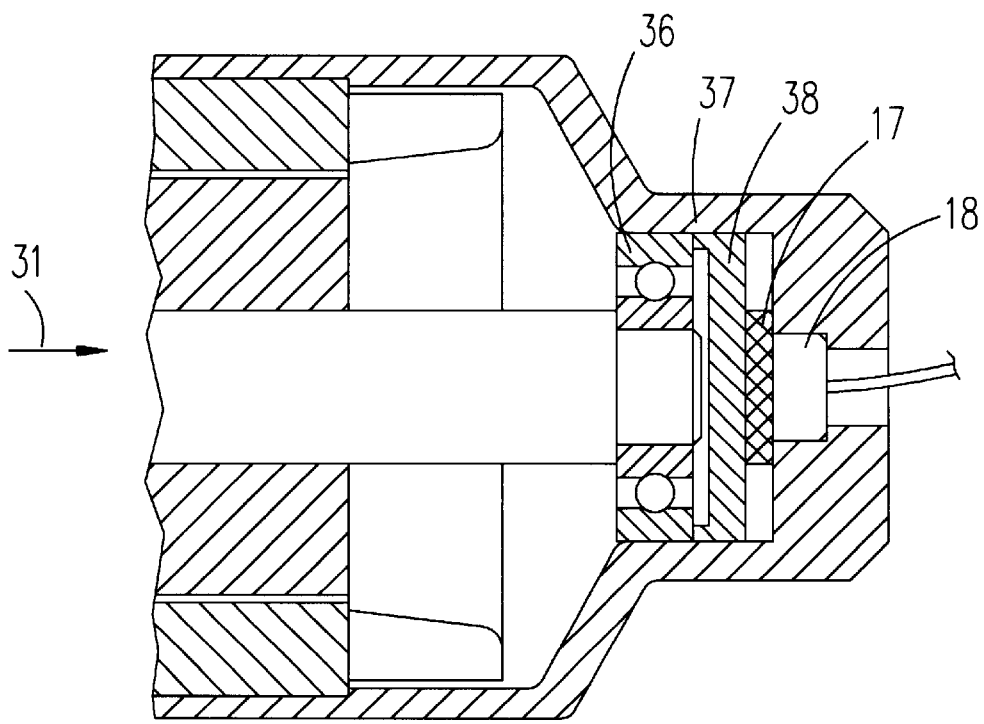

FIG. 9 illustrates a heavier duty application where the thrust is contained by a combined journal and thrust deep groove ball bearing 36. The outer track ring of this bearing is made a free sliding fit in the recess in the motor housing 37 and abuts a plate 38 which is also a free sliding fit in the same recess. The resilient polymer disc 17 is bonded to the plate 38 and the pressure transducer 18 is mounted as before into the smaller recess at the end of the motor housing 37.

Figure 10:
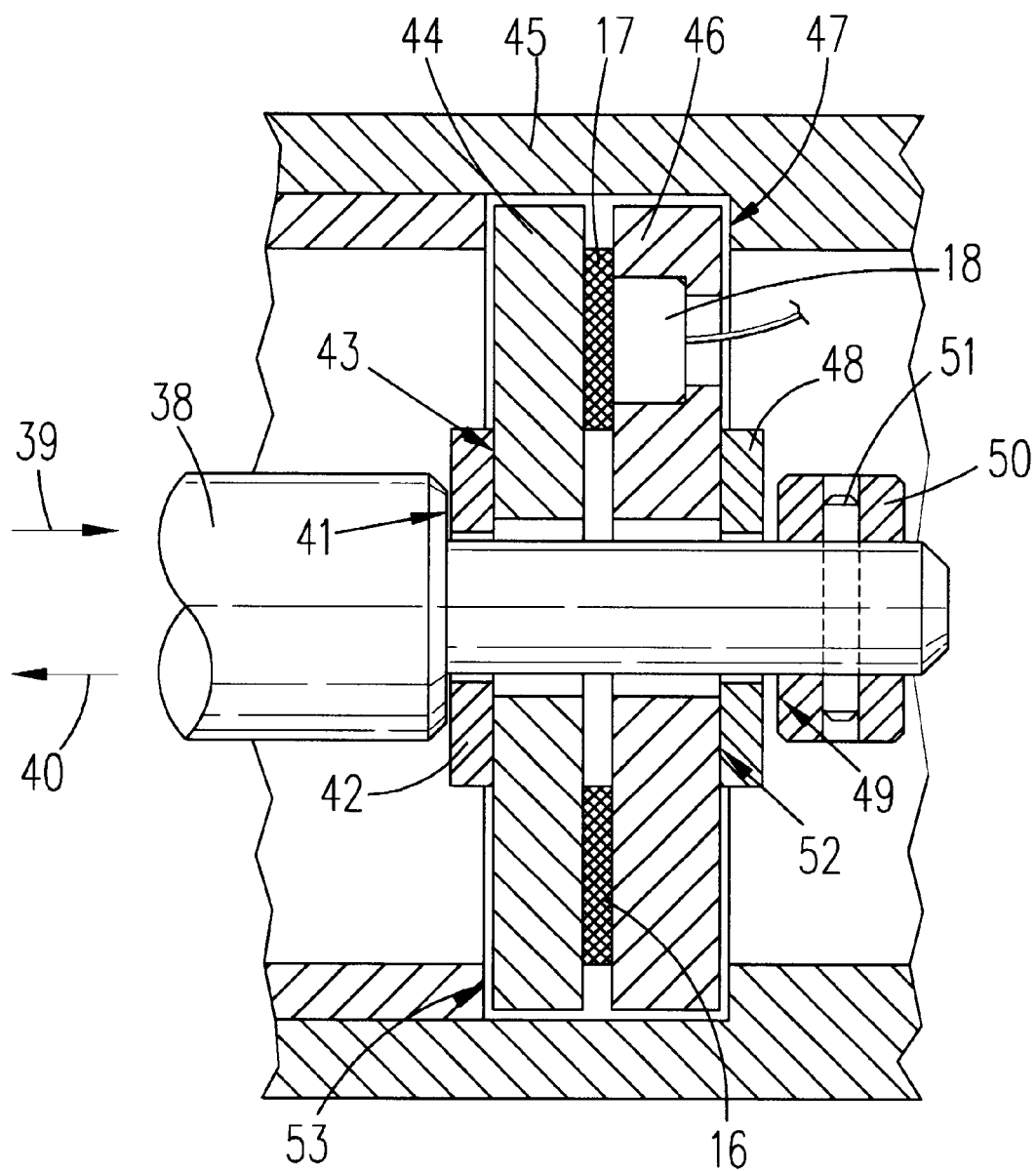
FIG. 10 illustrates a simplified version of the thrust sensor shown in FIG. 1.

The essential operating feature of the two directional shaft thrust measuring assemblies, as described and illustrated in FIG. 1 and FIG. 5, is shown in simplified form in FIG. 10 in which the alternative directions of the thrust on the shaft 38 are denoted by arrows 39 and 40.

When the thrust on the shaft 38 is acting in direction 39 the reacting force is transmitted, via the abutment 41, between the shaft and the thrust washer 42 and thence, via the thrust washer face 43 to the plate 44 which is free to slide axially in the recess in the housing 45. The force is transmitted by the two resilient polymer discs 16 and 17 which are fixed to the plate 44 and thence to the mounting plate 46 containing the single pressure transducer 18 co-operating with the resilient polymer disc 17. The mounting plate 46 is also a free slidina fit in the housing 45 and the force is finally transmitted to the housing via the abutment 47.

When the thrust is acting in the reverse direction 40 the reacting force is transmitted first to the thrust washer 48 via the abutment 49 between the washer and the collar 50. This collar is fixed to the shaft by the pin 51. The force is now transmitted via the thrust washer face 52 to the mounting plate 46 and thence, via the resilient polymer discs 16 and 17, to the plate 44 and, finally, to the housing 45 via the abutment 53 between the plate 44 and the housing 45.

Thus it can be seen that the pressure transducer 18 will give a reading proportional to thrust when the thrust is acting in either direction as indicated by the arrows 39 and 40.

In practice, it may be necessary to fix the radial positions of plates 44 and 46 by means of keys and key-ways or equivalent features to ensure that the pressure transducer and the resilient polymer discs remain in a given radial position.

FIG. 11 shows an embodiment in which a single annular shaped resilient polymer member 54 is sandwiched between the plates 55 and 56. These plates correspond in position and operation to the mounting plate 11 and backing plate 12 in FIG. 1 but plate 56 is provided with a recessed annular surface 57 onto which the annular shaped resilient polymer member, or elastomeric pad, 54 is mounted. The inner and outer annular wails of the recess form a close fit with the inner and outer circular walls of the polymer member. The recess annular wails are extended to provide a sliding fit on cooperating diameters on plate 55. Similarly, the polymer member is provided with close fitting holes through which pass the tension shoulder bolts 24. By these means the resilient polymer member when fitted into its operating position, has no free edge areas.

This particular embodiment enables a homogeneous silicone rubber pad to be used with no danger of the pad suffering a permanent area change due to creep phenomenon as may occur with the polymer pad having an unsupported edge.

In a situation, where the range of axial thrusts to be measured exceeds the normal operating signal range of the pressure transducer, the effective area of the annular shaped resilient polymer member 54 can be altered by changing the inner and outer diameters and making corresponding changes to the cooperating diameters of plates 55 and 56 so that the pressure range transmitted by the polymer member can be held within the working pressure range of the transducer.

This may be achieved by use of a plate having multiple evenly spaced recesses so that the recess(es) used may be selected to suit the number, shape and size of pads. Alternatively, a selection of the most suitable compression plate having the appropriate dimension of recess(es) may be taken from a range of preformed otherwise readily interchangeable such plates. Alternatively, the recesses may be adjustable in size having adjustable side walls that may be moved together or apart.

Figure 12:
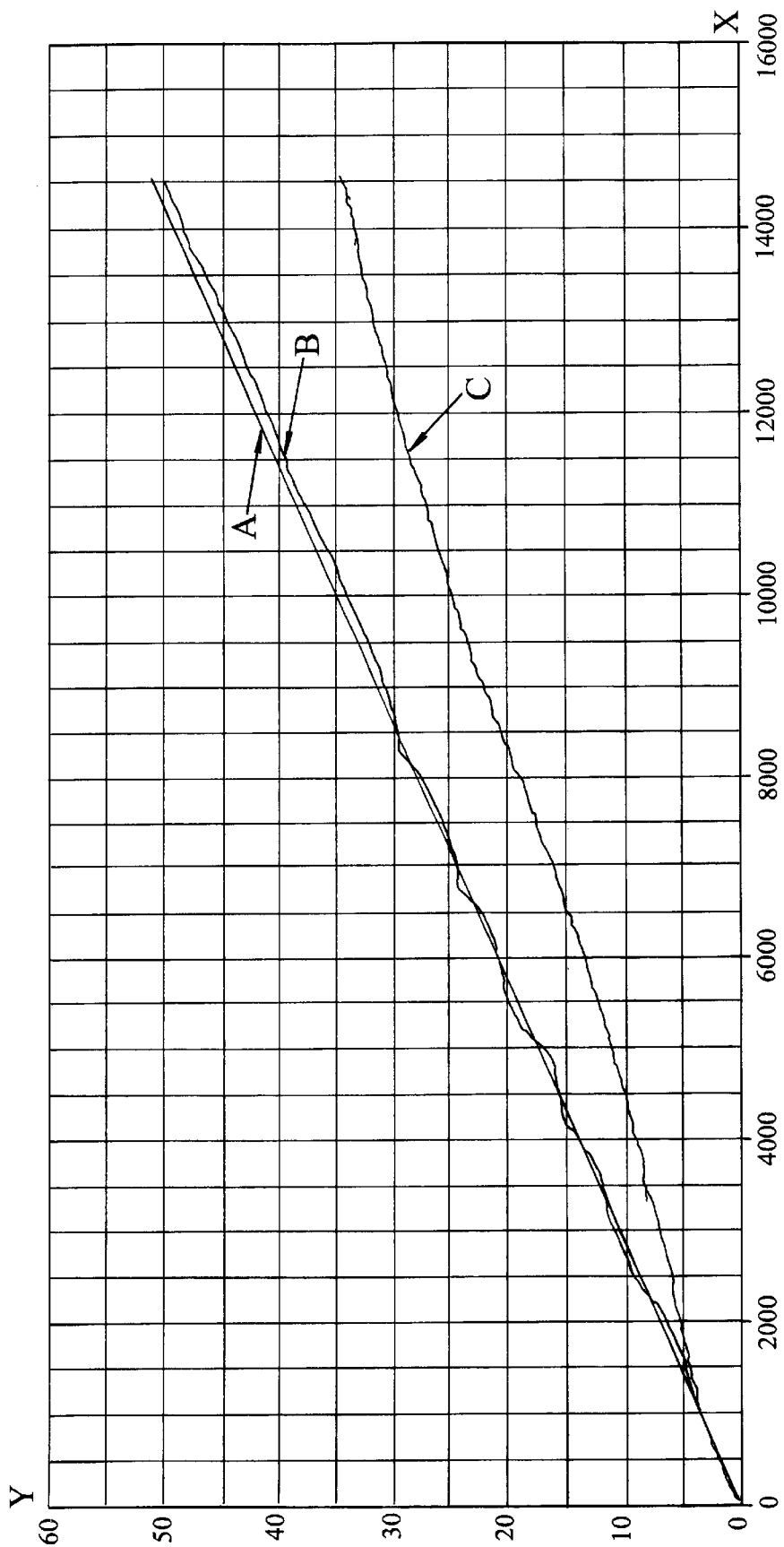
FIG. 12 is a graphical illustration of the results of a comparative test, comparing use of an assembly in which the pad periphery is unconstrained with an assembly in which the pad is constrained.

FIG. 12 provides a graph illustrating the surprising substantial benefits of constraining the pad periphery. As will be seen from line C on the graph, when 3 circular silicone pads of 2 mm thickness and 19 mm diameter were subjected to increasing compression in a first thrust sensor assembly in which the peripheries of the pads were unconstrained the correspondence in the reading from the piezo-resistive pressure sensor (Y-axis 0–60 mV) with increase in applied compressive load (X-axis 0–1,600 N) as shown in line C deviated markedly from the expected (line A). By contrast, when the assembly was adapted to provide constraint to the pad peripheries the sensor output, line B, closely matched the expected (line A).

It will be appreciated that other shapes and numbers of resilient pads can be used in order to keep within the working pressure range of the transducer provided that, when using the low hardness silicone rubber material all edges of the resilient member(s) are constrained by rigid surrounding walls in one or other of the plates 55 and 56 without departing from the scope of the invention.

In summary, therefore, the objectives of the invention are as follows:

1) To provide a means and method for measuring the axial thrust generated in the shaft of an actuator by, firstly, arranging for the force to react against a resilient elastomeric member or members which are sandwiched between rigid members of known contact areas and, secondly, to measure continuously the pressure so generated in the resilient elastomeric member or members by at least one electronic pressure transducer.

2) To provide means whereby the contact area between the rigid and resilient members which withstand the reaction forces generated by the said shaft can be varied so that forces at the high end of the range may be measured using relatively large contact areas and forces at the low end of the range may be measured using relatively small contact areas with the object of keeping the resulting generated pressure range within the working range of the said at least one electronic pressure transducer.

3) In an actuator using a worm and worm wheel reduction gear drive, to determine continuously the torque being transmitted by the worm wheel by measuring the reacting axial force set up in the worm shaft using the means described in objectives (1) and (2) and multiplying the force value so obtained by the pitch circle radius of the worm wheel.

4) In the aforementioned objectives, to provide means such that forces acting in a direction which is parallel or coincident with the shaft axis but which may be in directions which are 180 degrees apart will always impart a compressive reacting force on the said resilient member facing at least one pressure transducer.

5) In actuators as previously described, to provide one or more electronic pressure transducers in which the movement of the transducer sensitive face relative to the surrounding mounting plate is relatively very small so that there is no significant deviation of pressure in the said resilient member in the region in close proximity to the transducer sensitive face. In this context the deflection of the transducer sensitive face will, for example, be of the order of one thousandth of the effective face diameter.

6) In the aforementioned objectives, to provide at least one electronic pressure transducer in which the sensitive face of the transducer is at right angles to the shaft axis but is offset from the shaft axis.

7) To mitigate or substantially prevent the error arising from use of resiliently compressible elastomeric pads in the thrust sensor assembly by constraining the pad peripheries to substantially prevent them from bulging in use.

What is claimed is:

1. A thrust sensor assembly suitable for use with an actuator of the type wherein motive power is applied to an actuator shaft and wherein the thrust sensor assembly comprises a first compression plate means and a second compression plate means, at least one of said compression plate means being engageable with said shaft to move axially with said shaft and the second compression plate means being arranged to oppose the first compression plate means with at least one resiliently compressible, substantially elastomeric pad sandwiched therebetween, a pressure transducer being mounted on one of said compression plate means, said at least one pad having a contact face with a contact area facing said one of the compression plate means having said pressure transducer mounted thereon whereby the sensor assembly is arranged so that movement of the first compression plate means towards the second compression plate means compresses said elastomeric pad between said first and second compression plate means with only part of the contact area of the pad pressing against the pressure transducer and thereby inducing a signal from said pressure transducer that corresponds to the thrust of said actuator shaft, the thrust sensor assembly being configured such that the total contact area of the surface of said compressible pad facing said one of said compression plate means bearing the pressure transducer is selectively variable to alter the proportion of thrust transmitted to the transducer by replacing said pad with at least one other differently sized pad or different number of said pad, whereby the sensor assembly accommodates a wide range of actuator thrusts while maintaining the pressure applied to said pressure transducer within the operating range of said pressure transducer.

2. A thrust sensor assembly according to claim 1, wherein said resiliently compressible pad is of a laminated construction, comprising a pair of resiliently compressible layers, one on each side of a layer of higher modulus of elasticity material.

3. A thrust sensor assembly according to claim 1, wherein said pad is fixedly mounted on one of said first and second compression plate means.

4. A thrust sensor assembly according to claim 1, wherein at least one of said compression plate means includes a rigid intermediate member and wherein said pad is mounted on said rigid intermediate member, so that thrust is transmitted from said first compression plate means to said pad via said intermediate member.

5. A thrust sensor assembly according to claim 1, wherein said at least one pad has a periphery and wherein one of said compression plate means has at least one recess to fully accommodate said at least one pad and fully constrain the periphery of said pad, whereby said pad is fully peripherally constrained.

6. A thrust sensor assembly according to claim 4, wherein said at least one pad has a periphery and wherein said intermediate member is provided with at least one recess, and wherein said recess is dimensioned to fully accommodate said at least one pad and fully constrain the periphery of said pad, whereby said pad is fully peripherally constrained.

7. A thrust sensor assembly according to claim 5 wherein the compression plate means opposing and pressing towards said one of the said compression plate means having said recess is configured to project into said recess to press against said pad.

8. A thrust sensor assembly according to claim 6 wherein said intermediate member opposing and pressing towards said one of said compression plate means having said recess is configured to project into said recess to press against said pad.

9. A thrust sensor assembly according to claim 5 wherein an incompressible insert is provided in said recess to lie over said pad and evenly transmit the compressive force to the pad.

10. A thrust sensor assembly according to claim 1 wherein said actuator shaft moves axially in a forward direction and in a reverse direction and said second compression plate means is engageable with said shaft to move with said shaft when said shaft moves in the reverse direction and said first compression plate means is disengageable from said shaft to not move when said shaft moves in the reverse direction, whereby the thrust in the reverse direction is sensed.

11. A thrust sensor assembly according to claim 1, wherein said compression plate means each have a face, wherein said pressure transducer has a pressure-sensitive face and is incorporated into one of said compression plate means with the pressure-sensitive face of the transducer flush with the face of the compression plate means in which it is mounted.

12. A thrust sensor assembly according to claim 1, wherein each compression plate means is circular.

13. A thrust sensor assembly according to claim 1, wherein each compression plate means is annular.

14. A thrust sensor assembly according to claim 1, wherein each compression plate means is circular and annular.

15. A thrust sensor assembly according to claim 1, wherein each resilient pad is circular.

16. A thrust sensor assembly according to claim 1, wherein each resilient pad is annular.

17. A thrust sensor assembly according to claim 1, wherein each resilient pad is circular and annular.

18. A thrust sensor assembly according to claim 1, wherein two resilient pads are provided, said pads being positioned diametrically opposed to each other around said actuator shaft.

19. A thrust sensor assembly according to claim 1 where said assembly is mounted on a worm shaft of a worm and worm wheel type actuator gear box and so arranged that the axial force on the worm shaft is thereby measured, the said force is multiplied-by the pitch circle radius of the worm wheel to give a value of the torque being transmitted by the worm wheel to the output shaft of said actuator gear box.

20. A thrust sensor assembly suitable for use with an actuator of the type wherein motive power is applied to an actuator shaft and wherein the thrust sensor assembly comprises a first compression plate means and a second compression plate means, at least one compression plate means being engageable with said shaft to move axially with the shaft and the second compression plate means being arranged to oppose the first compression plate means with at least one resiliently compressible substantially elastomeric pad sandwiched therebetween, a pressure transducer being mounted on one of the compression plate means, whereby movement of said first compression plate means towards the second compression plate means compresses said elastomeric pad between said two compression plate means and against the pressure transducer inducing a signal from the pressure transducer that corresponds to the thrust of said actuator shaft, wherein said pad has a periphery and one of said compression plate means is provided with a recess to accommodate said elastomeric pad and constrain the periphery of said pad whereby said pad is so constrained.

21. A thrust sensor assembly according to claim 19, wherein said one of said compression plate means is provided with an intermediate member and said recess is provided on said intermediate member.

22. An actuator incorporating a thrust sensor assembly according to claim 1.

23. A thrust sensor assembly according to claim 1, where a plurality of said pads are provided, wherein said pads each have a contact face and wherein the contact area comprises the combined area of the contact face of said pads.

* * * * *